(12) United States Patent
Wong et al.

(10) Patent No.: US 9,723,877 B2
(45) Date of Patent: Aug. 8, 2017

(54) ELECTRONIC CIGARETTE

(71) Applicants: Tan Wong, Shanghai (CN); Yanming Nie, Shanghai (CN)

(72) Inventors: Tan Wong, Shanghai (CN); Yanming Nie, Shanghai (CN)

(73) Assignee: SHANGHAI GREEN VAPER TECHNOLOGY CO., LTD. (CN)

( * ) Notice: Subject to any disclaimer, the term of this patent is extended or adjusted under 35 U.S.C. 154(b) by 19 days.

(21) Appl. No.: 14/960,002

(22) Filed: Dec. 4, 2015

(65) Prior Publication Data
US 2016/0345626 A1 Dec. 1, 2016

Related U.S. Application Data

(63) Continuation of application No. 29/547,593, filed on Dec. 4, 2015.

(30) Foreign Application Priority Data

May 29, 2015 (CN) .......................... 2015 1 0283160
May 29, 2015 (CN) ..................... 2015 2 0356994 U
Aug. 6, 2015 (CN) .......................... 2015 3 0293039

(51) Int. Cl.
| | | |
|---|---|---|
| *A61L 9/03* | (2006.01) | |
| *A61M 16/00* | (2006.01) | |
| *A24F 47/00* | (2006.01) | |
| *H02J 7/00* | (2006.01) | |
| *H05B 3/42* | (2006.01) | |

(52) U.S. Cl.
CPC .......... *A24F 47/008* (2013.01); *H02J 7/0045* (2013.01); *H02J 7/0052* (2013.01); *H05B 3/42* (2013.01); *H02J 2007/0062* (2013.01); *H05B 2203/014* (2013.01); *H05B 2203/016* (2013.01); *H05B 2203/021* (2013.01); *H05B 2203/022* (2013.01)

(58) Field of Classification Search
None
See application file for complete search history.

(56) References Cited

U.S. PATENT DOCUMENTS

| | | | | |
|---|---|---|---|---|
| 2,876,410 | A * | 3/1959 | Fry ...................... | H01M 2/1044 219/240 |
| D527,477 | S * | 8/2006 | Chen ......................... | D14/480.3 |
| D537,181 | S * | 2/2007 | Chen ......................... | D14/480.3 |
| D568,313 | S * | 5/2008 | Leung ....................... | D14/480.3 |
| 7,375,494 | B2 * | 5/2008 | Daniel .................. | H01M 2/105 320/106 |

(Continued)

*Primary Examiner* — Thor Campbell
(74) *Attorney, Agent, or Firm* — Clement Cheng

(57) ABSTRACT

A USB electronic cigarette has an atomizer section. The atomizer section has a heat chamber configured to receive liquid from a fluid reservoir. A USB connector is formed on the atomizer section. The USB connector includes a USB socket mounted to the atomizer section. A battery section is releasable and detachable from the atomizer section at the USB connector. The USB connector includes a USB protrusion configured to fit into the USB socket. The USB protrusion is mounted to the battery section. A rechargeable battery is housed within the battery section and configured to be recharged via the USB protrusion. A user is provided a smokable USB stick that is USB rechargeable.

12 Claims, 3 Drawing Sheets

(56) References Cited

U.S. PATENT DOCUMENTS

| | | | | |
|---|---|---|---|---|
| D582,915 S * | 12/2008 | Leung | | D14/480.3 |
| D645,817 S * | 9/2011 | Sasada | | D13/108 |
| 8,770,997 B2 * | 7/2014 | Yu | | H01R 35/02 |
| | | | | 439/164 |
| 8,845,121 B2 * | 9/2014 | Jarzac | | F21L 4/08 |
| | | | | 2/422 |
| 8,897,628 B2 * | 11/2014 | Conley | | A61M 11/042 |
| | | | | 392/386 |
| 9,555,203 B2 * | 1/2017 | Terry | | A24F 47/008 |
| 2003/0050092 A1 * | 3/2003 | Yun | | H04M 1/0262 |
| | | | | 455/556.1 |
| 2010/0046579 A1 * | 2/2010 | Baker | | G01J 5/02 |
| | | | | 374/152 |
| 2013/0062335 A1 * | 3/2013 | Davis, Jr. | | F23Q 7/16 |
| | | | | 219/507 |
| 2013/0087160 A1 * | 4/2013 | Gherghe | | A24F 47/008 |
| | | | | 131/329 |
| 2013/0192615 A1 * | 8/2013 | Tucker | | H01C 17/00 |
| | | | | 131/328 |
| 2013/0298905 A1 * | 11/2013 | Levin | | A24F 47/008 |
| | | | | 128/202.21 |
| 2014/0014124 A1 * | 1/2014 | Glasberg | | A24F 47/008 |
| | | | | 131/328 |
| 2014/0014125 A1 * | 1/2014 | Fernando | | A24F 47/008 |
| | | | | 131/328 |
| 2015/0053214 A1 * | 2/2015 | Alarcon | | A24F 47/00 |
| | | | | 131/273 |
| 2015/0053217 A1 * | 2/2015 | Steingraber | | A24F 47/008 |
| | | | | 131/329 |
| 2015/0059779 A1 * | 3/2015 | Alarcon | | A24F 47/00 |
| | | | | 131/273 |
| 2015/0128972 A1 * | 5/2015 | Verleur | | A24F 47/008 |
| | | | | 131/329 |
| 2015/0128976 A1 * | 5/2015 | Verleur | | A24F 47/008 |
| | | | | 131/329 |
| 2015/0150305 A1 * | 6/2015 | Shenkal | | A24F 47/008 |
| | | | | 131/329 |
| 2015/0167976 A1 * | 6/2015 | Recio | | F23Q 7/16 |
| | | | | 219/209 |
| 2015/0224268 A1 * | 8/2015 | Henry | | A24F 47/008 |
| | | | | 128/202.21 |
| 2016/0131360 A1 * | 5/2016 | Isayan | | F22B 1/28 |
| | | | | 392/386 |

\* cited by examiner

ELECTRONIC CIGARETTE

The present invention is a continuation in part of U.S. application Ser. No. 14/541,945 filed Nov. 14, 2014 by same inventor Dan Wang aka Tan Wong and Yanming Nie, the disclosure of which is incorporated herein by reference. The present invention also claims priority from China utility model Application No. 201520356994.0 filed May 29, 2015, entitled An Inhaler Of Liquid Chewing Gum, by applicant Shanghai Green Vaper Technology Co., Ltd. and inventors Dan Wang aka Tan Wong and Yanming Nie, the disclosure of which is incorporated herein by reference.

FIELD OF THE INVENTION

The present invention is in the field of electronic cigarettes.

DISCUSSION OF RELATED ART

The USB stick is a ubiquitous memory storage device that is convenient for file transfer and storage use with personal computers. Unfortunately, it suffers the drawback of not being smokable like a cigarette to satisfy nicotine cravings.

The electronic cigarette is a relatively recent version of combustion based cigarettes. The electronic cigarette includes a battery that powers a vapor generating chamber. A variety of different vapor generating electronic cigarettes have been discussed in the patent literature. For example, in U.S. patent application Ser. No. 14/541,945 filed Nov. 14, 2014 by same inventors Dan Wang aka Tan Wong and Yanming Nie, an atomizer element is provided that has a heating chamber and a reservoir. Additionally in U.S. Pat. No. 8,205,622 issued Jun. 26, 2012 to inventor Pan, entitled Electronic Cigarette, the disclosure of which is incorporated herein by reference, the Pan disclosure provides for an atomizer element with heating chamber and reservoir.

SUMMARY OF THE INVENTION

A USB electronic cigarette has an atomizer section. The atomizer section has a heat chamber configured to receive liquid from a fluid reservoir. A USB connector is formed on the atomizer section. The USB connector includes a USB socket mounted to the atomizer section. A battery section is releasable and detachable from the atomizer section at the USB connector. The USB connector includes a USB protrusion configured to fit into the USB socket. The USB protrusion is mounted to the battery section. A rechargeable battery is housed within the battery section and configured to be recharged via the USB protrusion. A user is provided a smokable USB stick that is USB rechargeable.

An atomizer housing has an atomizer section openings configured to receive intake air. A lens is mounted on the battery section opening that is formed on a lower tip of the battery section. An indicator light is mounted to be visible through on the battery section opening. The indicator light is selectively activated when an airflow sensor transducer senses airflow near the airflow sensor. The airflow sensor is a transducer. The transducer is a microphone or air pressure sensor.

An atomizer housing has battery section openings configured to receive intake air. The intake air passes through a battery section air channel and exits the battery section at a battery section air passage. Air exiting the battery section air passage enters the atomizer section at an atomizer section air channel. Air exiting the atomizer section air channel enters a heat chamber. The battery section further includes a USB memory chip for storing data.

Figure 1:
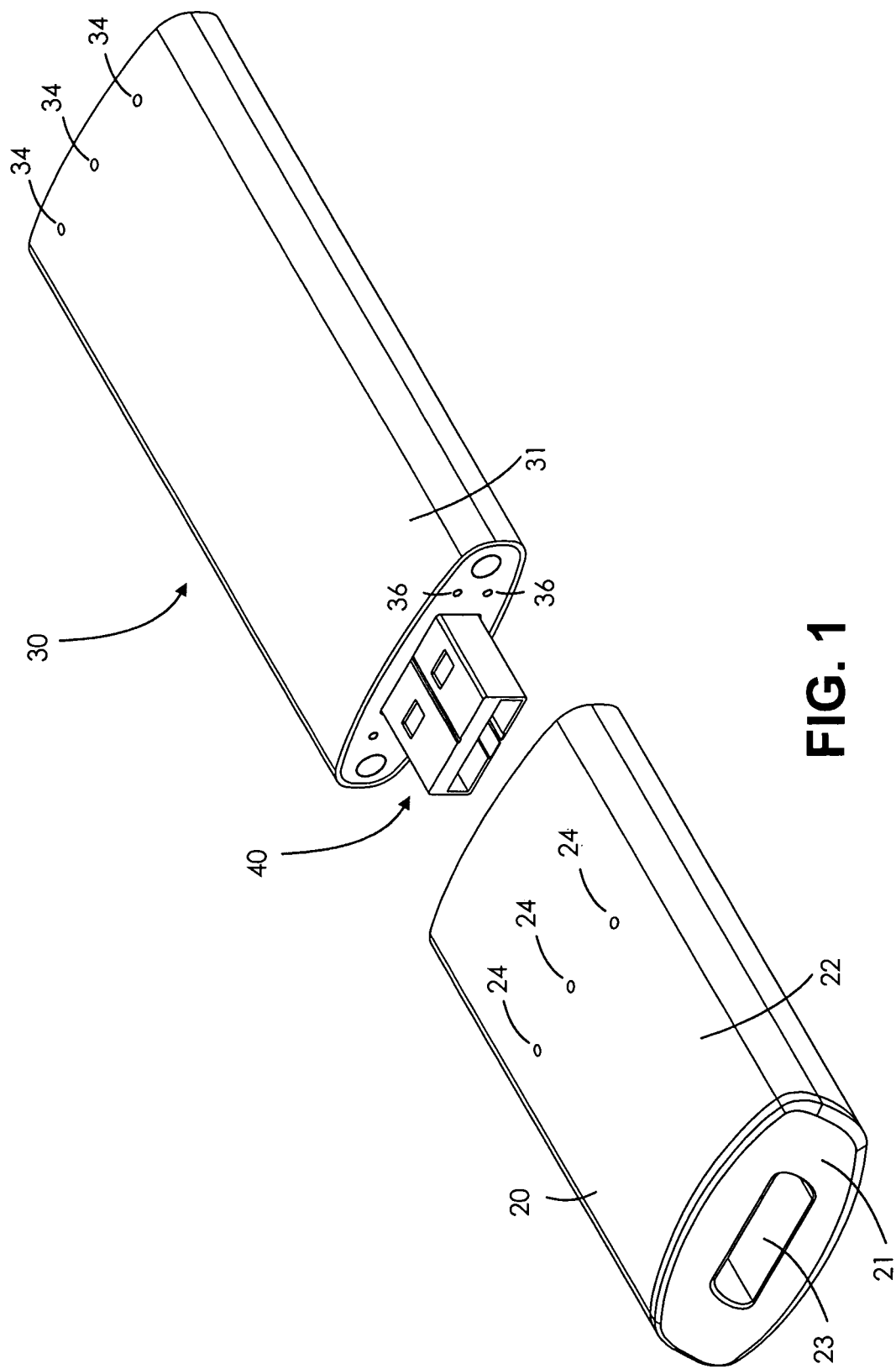
FIG. 1 is a perspective detached configuration view of the present invention.
Figure 2:
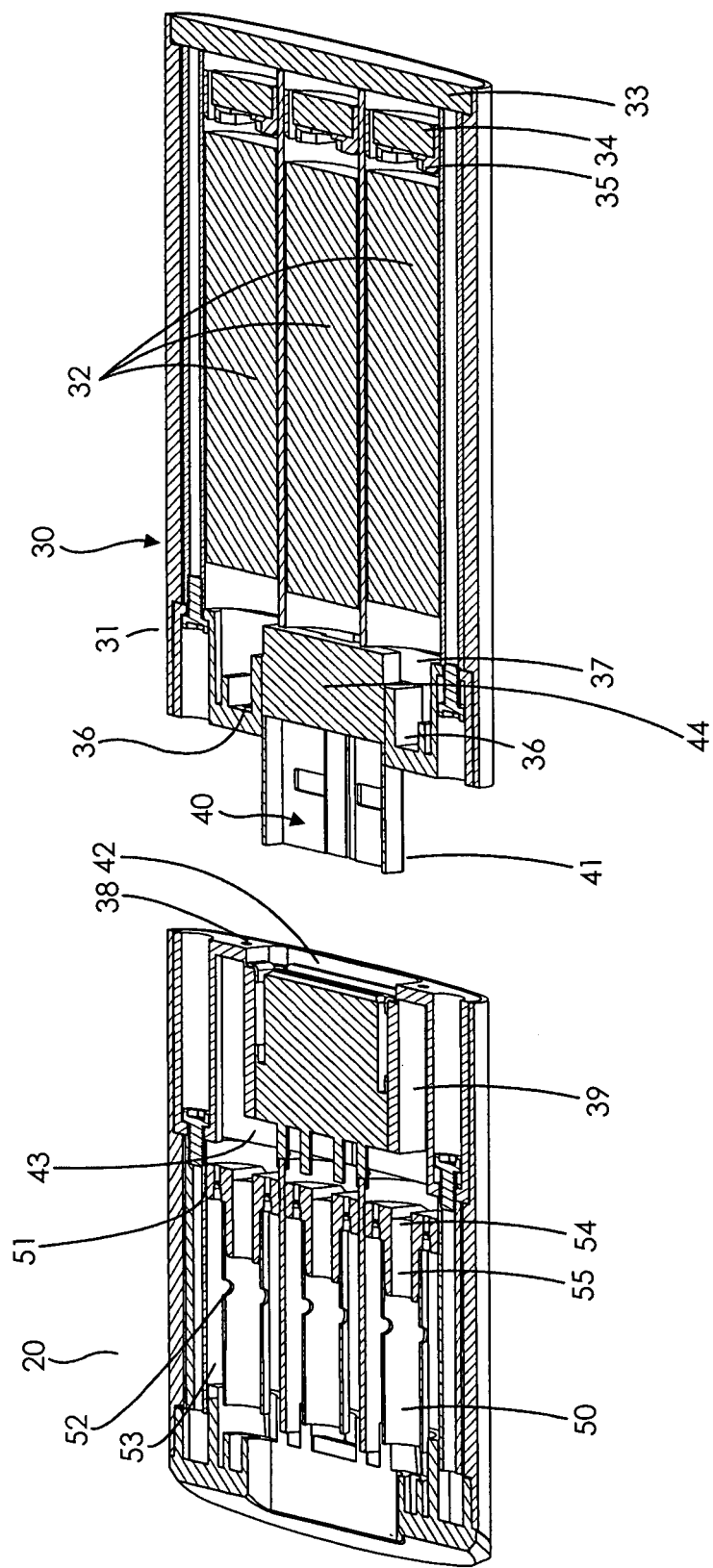
FIG. 2 is a perspective cross-section detached configuration view of the present invention.
Figure 7:
FIG. 7 is a left side view of the present invention in assembled configuration.
Figure 6:
FIG. 6 is a right side view of the present invention in assembled configuration.
Figure 5:
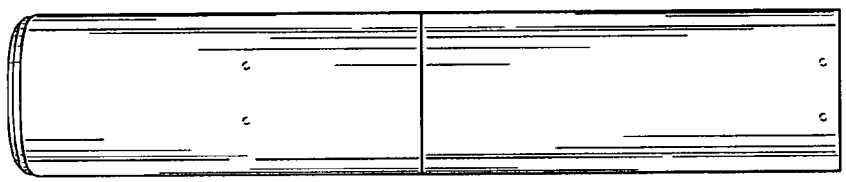
FIG. 5 is a rear view of the present invention in assembled configuration.
Figure 9:
FIG. 9 is a bottom view of the present invention in assembled configuration.
Figure 4:
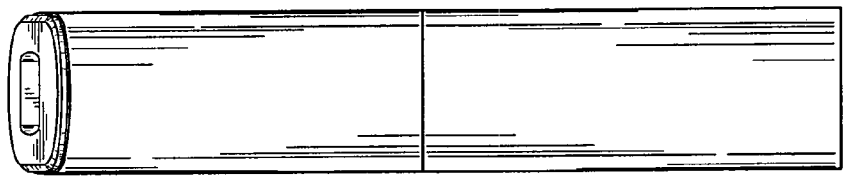
FIG. 4 is a front view of the present invention in assembled configuration.
Figure 8:
FIG. 8 is a top view of the present invention in assembled configuration.
Figure 3:
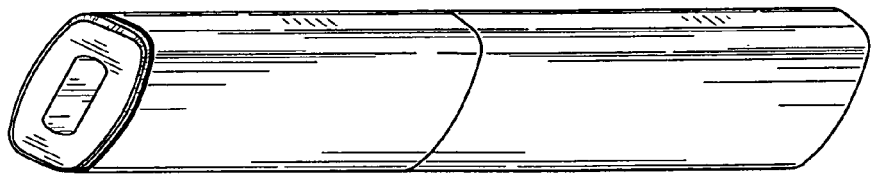
FIG. 3 is a perspective view of the present invention in assembled configuration.

The call list of elements can be a useful guide for referencing the element numbers of the drawings.

20 atomizer section
21 mouthpiece
22 atomizer housing
23 mouthpiece opening
24 atomizer section opening
30 battery section
31 battery housing
32 rechargeable battery
33 lens
34 battery section opening
35 airflow sensor transducer
36 battery section air passage
37 battery section air channel
38 atomizer air passage
39 atomizer section air channel
40 USB connector
41 USB protrusion
42 USB socket
43 USB socket leads
44 USB memory chip
50 atomizer element
51 one-way flow valve
52 wick openings
53 fluid reservoir
54 atomizer element lower end
55 heat chamber

DETAILED DESCRIPTION OF THE PREFERRED EMBODIMENT

The essence of the present invention is a USB stick that a user can vape. The user can use the USB stick by inserting it into a computer. The user can access and transfer files on the USB stick while the batteries are charging. After the user is done using the USB stick, the user can smoke or vape from the USB stick. The USB stick can optionally keep track of vaping habits in a log file that is accessible through the USB interface using a text viewer application on the personal computer. In this manner, the USB stick can optionally monitor a smoking cessation program. The USB stick has a housing that can look like a regular USB stick.

The USB stick has a first and second USB interface. The first USB interface can be a protrusion and the second USB interface can be a socket. The protrusion can fit into the socket like a regular USB stick has a protrusion portion that fits on a lid, cap or cover. The protrusion which is the first USB interface can be connected to a battery section, and the socket which is the second USB interface can be connected to a atomizer section. The atomizer section can have a mouthpiece shaped as a nozzle to allow a user to inhale from the USB stick.

A user can open the atomizer section and add liquid to the reservoir. The reservoir has cotton for retaining vape liquid. When the battery is low the user can recharge the USB stick by inserting it into a USB socket on a PC or a USB socket on a power supply such as a transformer. The two main sections are the atomizer section, and the battery section. The atomizer section is removable from the battery section.

The atomizer section 20 has a mouthpiece 21 that is connected to the atomizer housing 22. The atomizer housing 22 optionally has three atomizer section openings 24 which can receive air and also have a light mounted for providing an indication of atomizer activation. The mouthpiece 21 has an angled and slanted flat top face. The mouthpiece 21 has a mouthpiece opening 23 formed on the top face of the mouthpiece 21. The mouthpiece opening 23 can be oval or pill shaped. The mouthpiece 21 can be formed as an insert that inserts into the generally hollow atomizer housing 22. If the atomizer housing 22 is formed as a tube of oval, circular or pill shaped cross-section, the mouthpiece 21 can be adapted to fit as a cap removably inserted into the atomizer housing 22. A user can remove the mouthpiece 21 to open the atomizer section 20 for adding more liquid or for cleaning. The atomizer section opening 24 can be vented so that it optionally provides a filtered vented air intake for the atomizer held within the atomizer housing 22.

The battery section 30 has a battery housing 31 that is generally coplanar to the atomizer housing 22 along an upper circumferential periphery of the battery housing 31. Battery housing 31 has a USB connector 40 mounted to the battery housing 31.

The USB connector 40 includes a USB protrusion 41 mounted to the battery section 30. The battery section 30 also has one or more rechargeable batteries 32. The lower tip of battery section 30 has a lens 33 through which a user can see a plurality of indicator lights mounted on the battery section openings 34. The lights mounted near the battery section opening 34 can be selectively activated when an airflow sensor transducer 35 senses airflow that is sucked through the airflow sensor transducer 35 coming from the battery section opening 34 formed as an air intake or from elsewhere. The airflow sensor transducer 35 can be formed as a microphone that receives vibration or air pressure differences due to nearby airflow. The lights can be LED lights that have multicolor output and function such as cycling and fading. The USB connector 40 may also have a memory that is located on the USB chip 44 for storing files.

Airflow can pass around the light near the battery section opening 34 across the airflow sensor transducer 35 which lights up the light near the battery section opening 34. Airflow can then pass around the rechargeable batteries 32 for cooling the rechargeable batteries and heating the intake air. Then air can pass around the USB chip 44 and through a battery section air channel 37. The battery section air channel 37 exits the battery section 30 at a battery section air passage 36.

The atomizer section 20 has an atomizer element 50 that has wick openings 52 for pulling fluid from the atomizer reservoir also called the fluid reservoir 53. The atomizer elements 50 can be combustion or heating chambers that produce vapor. The atomizer element 50 has an atomizer element lower end 54 that receives fresh air from the atomizer section air channel 39. The atomizer section air channel has an air intake which is the atomizer air passage 38. The atomizer air passage 38 is formed on the atomizer housing 22. The atomizer air passage 38 aligns with the battery section air passage 36 so that air can flow from the battery section air channel 37 through the battery section air passage 36 and then through the atomizer air passage 38 and into the atomizer section air channel 39. The air entering the atomizer element lower end 54 passes through the heat chamber 55 where the wick brings the fluid to the heat to allow fluid to become vapor. The atomizer elements 50 can be formed as tubes with wick openings 52. The wick openings 52 provide a passage for a wick made of cloth or thread to receive fluid from the fluid reservoir 53. The area around the tubular shaped atomizer elements 50 is the fluid reservoir 53. The fluid reservoir 53 can be packed with cotton or other fibrous material to allow storage of liquid.

A plug can fit on or over the mouthpiece opening 23 to provide liquid within the atomizer section 20. The fluid reservoir 53 can hold an oil or other fragrance liquid. Typically, the heat chamber 55 has a heating wire, and a cotton holder for liquid. The atomizer element 50 can be made of fiberglass or other heat resistant composite material.

Both the battery section 30 and the atomizer section 20 can be assembled together using screws. A pair of screws can connect the USB protrusion 41 to the battery housing 31. Similarly, the USB socket 42 can be connected to the atomizer housing 22 using a pair of screws. A pair of screw channels can be formed on both the battery housing 31 and the atomizer housing 22 to allow ease of assembly.

The atomizer elements 50 are preferably heat resistant which include a heat resistant internal atomizer reservoir with each atomizer element 50 having nebulizer fiber glass tubes. Optionally, a one-way flow valve 51 allows for one-way fluid flow or airflow. The heating wire is connected to the USB socket leads 43. The lower end of each slot atomizer in the atomizer housing 22 can have a vent opening for air intake. The atomizers can be housed in slots formed on the atomizer housing 22. Air intake can be from the atomizer light openings near the atomizer section opening 24 which are formed through an external surface of the atomizer housing 22. The atomizer elements 50 can be installed in slots formed on the atomizer housing 22.

The invention claimed is:

1. A USB electronic cigarette comprising:
   a. an atomizer section, wherein the atomizer section has a heat chamber configured to receive liquid from a fluid reservoir;
   b. a USB connector formed on the atomizer section, wherein the USB connector includes a USB socket mounted to the atomizer section;
   c. a battery section, wherein the battery section is releasable and detachable from the atomizer section at the USB connector, wherein the USB connector includes a USB protrusion configured to fit into the USB socket, wherein the USB protrusion is mounted to the battery section, wherein a rechargeable battery is housed within the battery section and configured to be recharged via the USB protrusion, whereby a user is provided a smokable USB stick that is USB rechargeable; and
   further including an atomizer housing that has battery section openings configured to receive intake air, wherein the intake air passes through a battery section air channel and exits the battery section at a battery section air passage, wherein air exiting the battery section air passage enters the atomizer section at an atomizer section air channel, wherein air exiting the atomizer section air channel enters a heat chamber.

2. The USB electronic cigarette of claim 1, further including an atomizer housing that has atomizer section openings configured to receive intake air.

3. The USB electronic cigarette of claim 1, further including a lens mounted on a battery section opening that is formed on a lower tip of the battery section, wherein an indicator light is mounted to be visible through on the battery section opening.

4. The USB electronic cigarette of claim 3, wherein the indicator light is selectively activated when an airflow sensor transducer senses airflow near the airflow sensor.

5. The USB electronic cigarette of claim 4, wherein the airflow sensor is a transducer.

6. The USB electronic cigarette of claim 5, wherein the transducer is a microphone or air pressure sensor.

7. The USB electronic cigarette of claim 1, wherein the battery section further includes a USB memory chip for storing data.

8. The USB electronic cigarette of claim 7, further including an atomizer housing that has atomizer section openings configured to receive intake air.

9. The USB electronic cigarette of claim 7, further including a lens mounted on a battery section opening that is formed on a lower tip of the battery section, wherein an indicator light is mounted to be visible through on the battery section opening.

10. The USB electronic cigarette of claim 9, wherein the indicator light is selectively activated when an airflow sensor transducer senses airflow near the airflow sensor.

11. The USB electronic cigarette of claim 10, wherein the airflow sensor is a transducer.

12. The USB electronic cigarette of claim 11, wherein the transducer is a microphone or air pressure sensor.

\* \* \* \* \*